(12) United States Patent
Schremmer

(10) Patent No.: US 6,206,421 B1
(45) Date of Patent: Mar. 27, 2001

(54) CONTROL CYLINDER FOR A STEERING SYSTEM OF A MOTOR VEHICLE

(75) Inventor: Gottfried Schremmer, Tamm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/303,430

(22) Filed: May 3, 1999

(30) Foreign Application Priority Data

May 2, 1998 (DE) .............................. 198 19 712

(51) Int. Cl.$^7$ ................. B62D 1/18; B62D 1/19
(52) U.S. Cl. ............ 280/775; 280/777; 188/280; 74/493
(58) Field of Search ................. 280/775, 777; 74/493; 188/280, 281, 282.5

(56) References Cited

U.S. PATENT DOCUMENTS

| | | | |
|---|---|---|---|
| 2,310,570 | * | 2/1943 | Briggs . |
| 3,043,404 | * | 7/1962 | Peras . |
| 3,109,520 | * | 11/1963 | Vossieck . |
| 4,485,900 | * | 12/1984 | Kato et al. ............... 188/282.5 |
| 4,961,482 | * | 10/1990 | Pohlenz et al. ............... 188/280 |
| 5,113,716 | * | 5/1992 | Dumschat et al. ............... 74/493 |
| 5,332,260 | * | 7/1994 | Heinrichs et al. ............... 280/775 |

FOREIGN PATENT DOCUMENTS

| | | |
|---|---|---|
| 39 35 832 | 12/1990 | (DE) . |
| 195 31 055 | 2/1997 | (DE) . |
| 0424629B1 | 10/1993 | (EP) . |

* cited by examiner

*Primary Examiner*—Paul N. Dickson
(74) *Attorney, Agent, or Firm*—Evenson, McKeown, Edwards & Lenahan, P.L.L.C.

(57) ABSTRACT

A control cylinder is provided in a vehicle steering column arrangement in order to displace two jacket tube parts, displaceable telescopewise with respect to one another, relative to one another. The control cylinder includes a cylinder housing filled with a damping medium and a piston axially displaceable in a cylinder. A flexible sealing lip is provided as a sealing member for a through bore in the piston. The lip in its unloaded resting position leaves the through-flow cross section open. Upon an abrupt relative movement of the piston and cylinder housing, the level of the impact load on the fluid moves the lip into a closed position that at least largely seals off the through-flow cross section, with the deformation resistance of the sealing lip being chosen so that the sealing lip remains in its resting position during normal adjustment between the piston rod and the cylinder housing. Embodiments with multiple through bores and sealing lips are also provided.

10 Claims, 1 Drawing Sheet

CONTROL CYLINDER FOR A STEERING SYSTEM OF A MOTOR VEHICLE

BACKGROUND AND SUMMARY OF THE INVENTION

This application claims the priority of German application 198 19 712.8, filed May 2, 1998 in Germany, the disclosure of which is expressly incorporated by reference herein.

The invention relates to a control cylinder for a steering system of a motor vehicle, with a cylinder housing in which a piston part secured to a piston rod is mounted linearly displaceably, said part dividing a cylinder chamber within the cylinder housing into working chambers located axially opposite one another, said chambers being filled completely with damping medium. The piston part has at least one through-flow cross section connecting the working chambers with one another, said cross section being sealable by sealing means.

A control cylinder of this kind is known from European Patent Document No. EP 0 424 629 B1 (corresponding to U.S. Pat. No. 5,113,716) for a steering column arrangement of a motor vehicle. The known steering column arrangement has two jacket tube parts displaceable telescopewise with respect to one another, with a hydraulic cylinder mounted axially parallel being provided for displacement. One end of the hydraulic cylinder is mounted permanently on the vehicle. The other end is fastened to the displaceable jacket tube part so that actuation of the hydraulic cylinder causes displacement of one jacket tube part relative to the other jacket tube part. A disk-shaped piston part is provided in the hydraulic cylinder, said part being secured to an axially displaceable piston rod. The piston part divides a cylinder chamber on the hydraulic cylinder into two working chambers filled completely with hydraulic oil. A through-flow bore is provided in the piston part, said bore connecting the two working chambers with one another. The through-flow bore can be closed by a switchable valve that serves as sealing means.

A goal of the invention is to provide a control cylinder of the type recited at the outset that provides improved occupant protection for a driver of the motor vehicle when the control cylinder is used in a steering column arrangement.

This goal is achieved according to preferred embodiments of the invention by virtue of the fact that at least one flexible sealing lip is provided as sealing means, said lip exposing the through-flow cross section in its unloaded resting position, said lip being deformable, upon an abrupt relative movement, by the level of an impact load into a closed position that seals off the through-flow cross section at least to a large extent. The resistance to deformation of the (at least one) sealing lip is chosen so that during normal control processes the sealing lip remains in its resting position between the piston rod and the cylinder housing. Hydraulic oil in particular is provided as the damping medium in the device according to the invention. The use at least largely of the incompressible damping medium is advantageous for the solution according to the invention.

As a result of the solution according to the invention, when a vehicle collision occurs, a relative movement between the piston part and the cylinder housing and hence a relative movement between a jacket tube part and the vehicle body is necessarily avoided. When an impact load is imposed from the steering wheel side on the steering column arrangement, displacement of the steering wheel into the cockpit area is avoided so that the steering wheel offers a reliable support for deploying an airbag. When the impact load is imposed in the opposite direction by the steering gear, the steering wheel is reliably prevented from being pushed into the vehicle interior and there leading to the risk of injury to the driver.

With the solution according to the invention, in which the control cylinder is designed as a damping cylinder, improved occupant protection is thus achieved. The at least one flexible sealing lip offers an especially simple solution for blocking corresponding adjusting movements of the control cylinder without external switching devices being required for the purpose.

In certain preferred embodiments of the invention, both of the end openings located opposite one another of the (at least one) through-flow cross section are each provided with at least one sealing lip. The opposite sealing lips are alternatively deformable into their closing positions under opposite axial loads. As a result, assurance is provided that the control cylinder can perform its blocking function in both opposite axial directions, so that the corresponding steering column part can be locked integrally with the vehicle under loads coming from the steering wheel and also from the opposite direction, namely from the direction of the steering gear.

In certain preferred embodiments of the invention, a remaining through-flow cross section that cannot be closed is provided which is much smaller than the closable through-flow cross section. As a result, impact energy can be reduced in the control cylinder and can simultaneously reduce a maximum load producing a maximum effect on the driver.

Other objects, advantages and novel features of the present invention will become apparent from the following detailed description of the invention when considered in conjunction with the accompanying drawings.

DETAILED DESCRIPTION OF THE DRAWINGS

Figure 1:
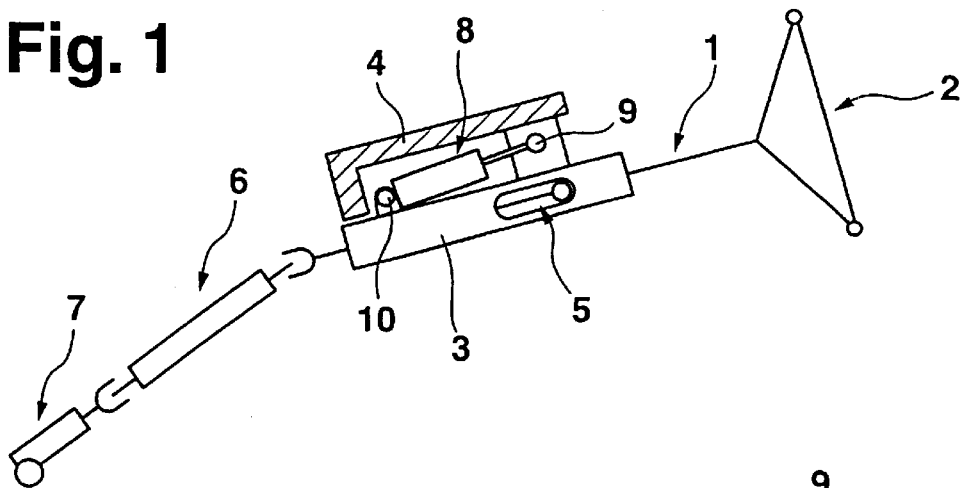
FIG. 1 is a schematic part sectional side view of a steering system constructed according to a preferred embodiment of the invention.
Figure 2:
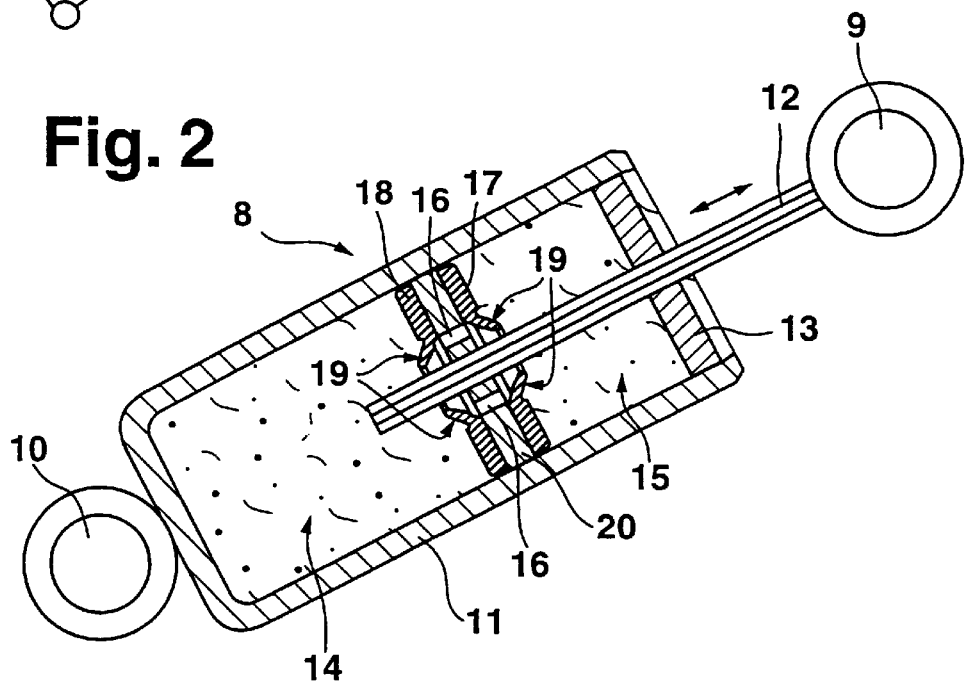
FIG. 2 is an enlarged view of a lengthwise section through a control cylinder of the steering system in FIG. 1.
Figure 3:
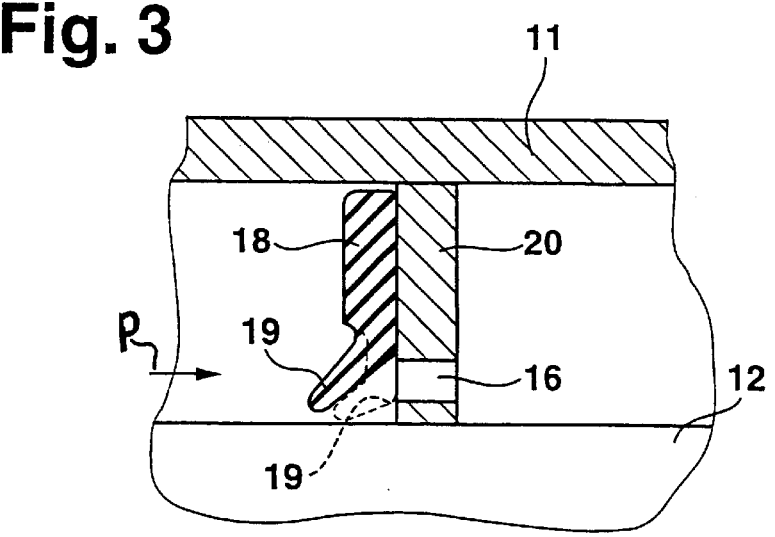
FIG. 3 is a view, enlarged further, of a portion of the control cylinder according to FIG. 2 at the level of a piston part within a cylinder chamber on the control cylinder.

A steering system for a motor vehicle according to FIGS. 1 to 3 has an upper Pitman shaft 1 which supports the steering wheel 2 in a manner known of itself on a side that projects into a vehicle interior. Pitman shaft 1 is mounted rotatably movably in a jacket tube part 3. Jacket tube part 3 is secured in a lengthwise adjustable manner relative to a bracket 4 integral with the vehicle coaxially to the axis of the Pitman shaft 1. For this purpose, the jacket tube part has a linear guide 5, shown only schematically, associated with it. The bracket 4 is secured to a supporting part of a body support structure, not shown in greater detail. At its lower end opposite steering wheel 2, the upper Pitman shaft 1 merges by a universal joint with a lower Pitman shaft 6 which terminates at the bottom in steering gear 7. Steering gear 7 transmits corresponding steering movements to a front axle of the motor vehicle.

A lengthwise adjustment of jacket tube 3 relative to the bracket 4 integral with the vehicle takes place in the embodiment shown by means of an adjusting device, not shown in greater detail. A hydraulic control cylinder 8 is also associated with the steering system, said cylinder acting as a damping cylinder. In an embodiment that is not shown, the hydraulic control cylinder referred to below as the hydraulic cylinder serves as a damper, as described below.

Hydraulic cylinder 8 is articulated at one end 9 with the bracket 4 integral with the vehicle and at its other end 10 with the jacket tube part 3 that is movable lengthwise. One end 9 is therefore associated with a piston rod 12 of hydraulic cylinder 8 and the other end 10 is associated with a cylinder housing 11 of hydraulic cylinder 8. Hydraulic cylinder 8 extends essentially axially parallel to the axis of Pitman shaft 1.

Piston rod 12 is designed as a polygonal lengthwise profile and is mounted so as to be linearly displaceable in the direction of the arrow (FIG. 2) in a cover plate of cylinder housing 11 that is provided with a matching shaped opening. Piston rod 12 supports a disk-shaped piston part 20 that is connected rigidly with piston rod 12 and divides a cylinder chamber within the cylinder housing 11 into two axially spaced working chambers 14, 15. The entire cylinder chamber is completely filled with a damping medium, hydraulic oil in the present case. The piston part in the form of a piston disk 20 separates the two working chambers 14, 15 basically tightly from one another. Piston disk 20 however has two or more through bores 16 that serve as through-flow cross sections that connect the working chambers 14, 15 together. The through bores 16 are located axially parallel and distributed around piston rod 12.

In the vicinity of the two opposite end openings, a flexible sealing lip 19 is associated with each of the through bores 16, said lips each being part of a sealing disk ring 17, 18. The sealing disk rings 17, 18 are mounted on opposite ends of piston disk 20 and each consists of an elastic plastic material. The sealing lips 19, made in one piece, have an annular profile. Sealing lips 19, likewise made annular, in the unloaded resting state project diagonally outward from the through-flow bores of 16 and keep these bores open. Sealing lips 19 however are elastically deformable against sealing disk rings 17, 18 in such fashion that at specific pressure loads corresponding to FIG. 3 they are pressed against the end openings of the through bores 16, so that they close the through bores 16.

The deformation resistance of sealing lips 19 is chosen so that sealing lips 19, during ordinary adjusting movements of jacket tube part 3 relative to bracket 4, remain in their resting positions that keep the through bores 16 open. However, as soon as a relatively high axial load caused by a vehicle impact acts on jacket tube part 3, the corresponding relative acceleration between piston rod 12 and cylinder housing 11 creates an oil pressure in the direction of the arrow P (FIG. 3) that is so high that the sealing lip 19 is deformed into its sealing position that closes through bores of 16 and/or into an open position that is defined. As a result, hydraulic cylinder 8 acts as a damping cylinder. In the manner of a rigid coupling, it blocks any relative movement between the jacket tube part 3 and bracket 4 and/or allows it to move in a specific manner. The sealing disk ring 17 opposite sealing disk ring 18 acts in the same manner as described above, including its sealing lip 19, when an axial load is applied in the opposite direction.

Hence it is important that the sealing lips 19 of the sealing disk rings 17, 18 remain in their resting position that keeps the through bores open during normal adjustment processes but in addition, when correspondingly strong, preferably abrupt, axial loads are applied, result in a closing or a reduction of the free cross sections of the through bores.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Control cylinder for a steering system of a motor vehicle, with a cylinder housing in which a piston part attached to a piston rod is mounted in a linearly displaceable manner, said piston part dividing a cylinder chamber within the cylinder housing into two working chambers axially opposite one another, said chambers being filled completely with a damping medium, with the piston part having at least one through-flow cross section connecting the working chambers together, said cross section being closable by at least one sealing member, wherein the at least one sealing member includes an annular flexible sealing lip, the annular flexible sealing lip projecting radially inwardly towards the piston rod, wherein said lip in its unloaded resting position being inclined in an axial direction relative to the piston part, keeping the through-flow cross section open and, upon an abrupt relative movement being deformable by the level of an impact load into a closed position that substantially seals off the through-flow cross section, with the resistance to deformation of the sealing lip being chosen so that the sealing lip remains in its resting position during normal adjustments between the piston rod and cylinder housing.

2. Control cylinder according to claim 1, wherein end openings opposite one another of the at least one through-flow cross section are each provided with at least one sealing lip, with opposite sealing lips being deformable alternatively into their closing positions under opposite axial loads.

3. Control cylinder according to claim 1, wherein a remaining through-flow cross section that cannot be closed is provided through the piston part that is much smaller than the through-flow cross section that can be closed by the sealing member.

4. Control cylinder according to claim 2, wherein a remaining through-flow cross section that cannot be closed is provided through the piston part that is much smaller than the through-flow cross section that can be closed by the sealing member.

5. Control cylinder according to claim 1, wherein the sealing lip projects diagonally away from the through-flow cross section.

6. Steering system for a motor vehicle comprising:

a steering column part that is at least axially adjustable, and a control cylinder aligned at least approximately axially parallel with and articulatedly connected with the column part, said control cylinder being articulatedly connected to a vehicle body part, said control cylinder including:

a cylinder housing in which a piston part attached to a piston rod is mounted in a linearly displaceable manner, said piston part dividing a cylinder chamber within the cylinder housing into two working chambers axially opposite one another, said chambers being filled completely with a damping medium, with the piston part having at least one through-flow cross section connecting the working chambers together, said cross section being closable by at least one sealing member, wherein the at least one sealing member includes a flexible sealing lip, said lip in its unloaded resting position keeping the through-flow cross section open and, upon an abrupt relative movement being deformable by the level of an impact load into a closed position that substantially seals off the through-flow cross section, with the resistance to deformation of the sealing lip being chosen so that the sealing lip remains in its resting position during normal adjustments between the piston rod and cylinder housing.

7. Steering system according to claim 6, wherein end openings opposite one another of the at least one through-flow cross section are each provided with at least one sealing lip, with opposite sealing lips being deformable alternatively into their closing positions under opposite axial loads.

8. Steering system according to claim 6, wherein a remaining through-flow cross section that cannot be closed is provided through the piston part that is much smaller than the through-flow cross section that can be closed by the sealing member.

9. Steering system according to claim 7, wherein a remaining through-flow cross section that cannot be closed is provided through the piston part that is much smaller than the through-flow cross section that can be closed by the sealing member.

10. A motor vehicle steering system damping assembly which is interposed between an axially adjustable steering column and a relatively fixed vehicle body part, said damping assembly including:

a cylinder housing filled with damping fluid and operatively arranged between the adjustable steering column and the fixed vehicle body part, and a damping piston which is axially displaceably movable in said cylinder housing, said damping piston including a through opening and an elastic sealing lip which is operable in a rest position to permit flow of damping fluid through said through opening, said sealing lip being configured to respond to abrupt relative movements of the cylinder housing and piston with at least a partial closure of the through opening to thereby block adjusting movement of the piston and cylinder housing during vehicle collision conditions.

* * * * *